United States Patent
Chien et al.

(10) Patent No.: US 8,436,507 B2
(45) Date of Patent: May 7, 2013

(54) ADJUSTABLE AXIAL-FLUX DISC MOTOR

(75) Inventors: Shih-Hsiang Chien, Yilan County (TW); Yee-Pien Yang, Taipei (TW); Shih-Hsin Hsu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 416 days.

(21) Appl. No.: 12/886,162

(22) Filed: Sep. 20, 2010

(65) Prior Publication Data
US 2011/0273050 A1 Nov. 10, 2011

(30) Foreign Application Priority Data
May 6, 2010 (TW) .............................. 99114529 A

(51) Int. Cl.
*H02K 1/22* (2006.01)
*H02K 21/04* (2006.01)
(52) U.S. Cl.
USPC . 310/268; 310/266; 310/156.32; 310/156.34; 310/156.35; 310/181
(58) Field of Classification Search ............... 310/266, 310/268, 156.32, 156.34–156.37, 238–248, 310/181; *H02K 21/04, 1/22*
See application file for complete search history.

(56) References Cited

U.S. PATENT DOCUMENTS

| 4,996,457 | A | * | 2/1991 | Hawsey et al. ................ 310/268 |
| 5,519,270 | A | * | 5/1996 | Yamada et al. ............. 310/67 R |
| 6,046,518 | A | * | 4/2000 | Williams ......................... 310/43 |
| 6,404,097 | B1 | * | 6/2002 | Pullen ............................ 310/268 |
| 6,509,666 | B1 | * | 1/2003 | Huang et al. ................ 310/254.1 |
| 6,974,399 | B2 | | 12/2005 | Lo |
| 7,468,568 | B2 | * | 12/2008 | Naito et al. ..................... 310/191 |
| 2002/0067091 | A1 | * | 6/2002 | Kliman et al. ............ 310/156.01 |
| 2006/0152104 | A1 | * | 7/2006 | Hino et al. ..................... 310/268 |
| 2006/0273676 | A1 | * | 12/2006 | Naruse et al. ............. 310/156.32 |
| 2007/0207477 | A1 | * | 9/2007 | Lee et al. ............................ 435/6 |
| 2008/0100166 | A1 | * | 5/2008 | Stahlhut et al. ........... 310/156.32 |

FOREIGN PATENT DOCUMENTS

| TW | 401923 | 8/2000 |
| TW | 483231 | 4/2002 |
| TW | 253800 | 4/2006 |
| TW | 303122 | 12/2006 |
| TW | I306324 | 2/2007 |

\* cited by examiner

*Primary Examiner* — John K Kim
*Assistant Examiner* — Daniel Haile
(74) *Attorney, Agent, or Firm* — WPAT, PC; Justin King

(57) ABSTRACT

An adjustable axial-flux disc motor, that is used in a flat space formed at a side or at the center of a wheel center for driving the wheel to rotate. The motor is activated to perform a rotation movement by the interactions of an electromagnetic field formed from the passing of an electric current through the armatures of its stator and a magnetic field resulting from the permanent magnet of its rotator. Moreover, there is a circular air gap sandwiched between the stator base and the rotator base, and the permanent magnet is further surrounded by coils. By adjusting the excitation current of the coils, the magnetic flux intensity can be modulated accordingly, and as the air gap magnetic flux is varied with the relative positioning of the stator and the rotator, the output characteristic of the motor will be varied accordingly.

5 Claims, 8 Drawing Sheets

ADJUSTABLE AXIAL-FLUX DISC MOTOR

TECHNICAL FIELD

The present disclosure relates to an adjustable axial-flux disc motor, and more particular, to an axial-flux motor capable of modulating its air-gap flux density without any adjustment to its air gap, but simply by surrounding its magnets with a soft magnetic composite material while enabling the soft magnetic composite material to be wrapped inside a coil, so that the magnetic flux intensity can be modulated simply by adjusting the excitation current of the coil, and consequently the air-gap flux density is varied.

TECHNICAL BACKGROUND

Please refer to FIG. 1 and FIG. 2, which show a conventional axial-flux permanent-magnet motor. It is known that a conventional axial-flux permanent-magnet motor, as the one shown in FIG. 1 and FIG. 2 that is primarily comprised of a stator 1 with a coil 11 and a rotor 2 with a permanent magnet 21, can be tuned and adapted to perform at a high-speed/low-torque mode or at a low-speed/high-torque mode simply by changing its air gap width, which can be achieved through the activation of its internal mechanism. That is, when the air gap is widened, the air-gap magnetic flux density will decrease and thus the rotation speed of the motor is increased, but on the other hand, when the air gap is narrowed, the torque of the motor is increased. Moreover, the rated speed of the motor can also be increased effectively by the use of a field-weakening control method or a phase advance method, using that the current phase of the stator 1 is controlled for suppressing the magnetic flux by counter magnetic flux and thus the rated speed of the motor can be increased effectively. However, for enabling a conventional motor to use an internal mechanism to adjust the air gap width against the normal force from the rotor 2, the structure of the motor can be very complex; and if the field-weakening control method or the phase advance method is used, in a long run that the permanent magnet 21 will be demagnetized and consequently the motor will be damaged.

There are already many studies for overcoming the aforesaid shortcomings. One of which is an ultra-thin motor, disclosed in TW Pat. No. I303122, by that not only the assembly and mass production efficiencies of the motor are improved, but also the problem troubling the thinning of conventional radial air-gap motors, such as the stacking of magnetic materials, is resolved.

The second such study relates to the internal mechanism design inside motors, disclosed in TW Pat. No. I253800, which is substantially a brushless direct current (DC) motor with planetary gears capable of switching the engagement between different gears for changing gear ratio and thus causing the output torque of the motor to increase or decrease accordingly.

The third such study relates to a motor that is disclosed in TW Pat. No. I306324. The motor is configured with a controller to be used for controlling its planetary gears to adjust the air gap width of the motor, and consequently, changing the torque of the motor.

The fourth such study relates to a motor control method designed for changing the output characteristics of a variable-winding brushless motor, disclosed in TW Pat. No. 401923, which focuses on the power drive control of an electric scooter, so as to achieve optimal control efficiency and the required torque at different road speeds (high starting torque at low speed and with a good range of speeds). The approach used is based on changing the winding connection at motor's stator, so that there are two sets of windings on the variable-winding brushless motor, whereas a closed-loop torque control scheme is proposed to integrate different characteristics by combining the changing winding connection structure and torque-speed control.

The fifth such study relates to a method for adjusting phase change opportunity in brushless DC motor basing upon its rotation speed, disclosed in TW Pat. No. 483231, in which current phase of the motor is adjusted for affecting the motor in a manner similar to the conventional field-weakening control method or the phase advance method, so as to increase the rated speed of the motor without having to change the structure of the motor or its relating driving apparatuses.

The sixth such study relates to a hub motor mechanism, disclosed in U.S. Pat. No. 6,974,399 B2, in which a one-way clutch is connected between a cover of the hub motor and the planetary gear system for gear change as the planetary gear system is received inside the hub motor. Thereby, not only the speed and torque variations due to the varying gear ratio controlled by the planetary gear system can be achieved, but also the transmitting efficiency of the hub motor can be improved by the use of the planetary gear system and thus the gear change of the hub motor can be performed smoothly.

The seventh such study relates to an automatic air gap varying means for modulating the output characteristic of a motor, disclosed in U.S. Pat. No. 6,404,097 B1. In operation, as the speed of rotation speed of the motor increases, a centrifugal force is generated which acts to bend the air gap varying means, and thereby, increasing the size of the air gap; and vice versa that a subsequent decrease in rotation speed will reduce the magnitude of the centrifugal force generated and allows the air gap varying means resume its original position so that the size of the air gap is decreased causing the output torque of the motor to increase.

The eighth such study relates to a rotating electric machine whose output characteristics can be easily and freely adjusted and varied even in operation, disclosed in U.S. Pat. No. 7,468,568 B2. According to this configuration, as the electric rotating machine is housed in a housing with the rotating shaft as an axle shaft, and the adjustment motor is positioned with its output shaft lying in the vehicle front-to-rear direction, the housing can be made slim. That is to say, the electric rotating machine can be used as an in-hub type power unit, and when used as an in-wheel motor, for example, a slim and compact power unit can be implemented. Moreover, it is able to adjust the gap between the rotor and stator by the internal gear linkage of the rotating electric machine even when the rotor is rotating.

Nevertheless, with reference to all the aforesaid patents, the currently available disc motors for electronic devices are all small power motor since the coils capable of being embedded therein are micro/nano scaled that they can not sustain the current loads of other common-sized motors, not to mention that there is no back iron constructed on the stator of those currently available disc motors, the torques that they can provided are limited. Moreover, for the speed change mechanisms that are used currently in those conventional motors, in addition to the shortcomings of highly complicated structure and high maintenance cost resulting from the regular maintenance requirements upon the internal gear box and transmission when the speed changing is enable through the internal mechanism of the motors, when the speed changing of the motor is achieved by adjusting current phase of the motor for affecting the motor in a manner similar to the conventional field-weakening control method or the phase advance method, it is disadvantageous in that the permanent magnet can be demagnetized in a long run and consequently the motor will be damaged.

Therefore, it is in need of an adjustable axial-flux disc motor capable of modulating its magnetic flux intensity without the help from any addition transmission mechanism, and consequently changing the air-gap flux density for enabling the rotation speed of the motor to vary according while preventing the motor from being damaged by the demagnetization of its magnets.

TECHNICAL SUMMARY

The present disclosure relates to an adjustable axial-flux motor, in which a permanent magnet with comparatively weaker magnetism is selected to be the source of a magnetic field in the motor. Any permanent magnet motor has a linear relationship to motor torque and current. This ratio is called the motor torque constant and is directly proportional to the voltage constant which describes the voltage generated per RPM or per rad/sec. Moreover, as motors are generally being defined to operate under a normal working range and when a motor is operating well outside its normal working range for a long period of time under field-weakening control, problems such as overheating or low working efficiency can be resulted. In addition to the use of permanent magnets as its magnetic field source similar to those conventional rotating motors, the motor of the present disclosure further has its magnets to be coiled by copper wires, copper plates or other conductive materials, and further being configured with electric brushes or other conductive means for conducting direct current into the conductive materials surrounding the permanent magnets so as to induce an electromagnetic field. Thereby, the magnetic intensity of the permanent magnets are increased and thus the working range of the motor is enlarged, so that the motor can work well both in a high-speed/low-torque configuration or in a low-speed/high-torque configuration.

The present disclosure provides an adjustable axial-flux motor, comprising:
  a stator, having a coil and a ring-shaped conductor; and
  a rotor, having a permanent magnet, a conductive element, at least one soft magnetic material and a pair of electric brushes;
  Wherein, the coil is wrapped on the stator; the stator is disposed spaced from the permanent magnet by air gap while the permanent magnet is disposed on the rotator; the conductive element is composed of a top layer and a bottom layer and is disposed next to the permanent magnet for surrounding the same while enabling the at least one soft magnetic material to be filled in a gap sandwiched between the two layer; the pair of electric brushes of the rotator is arranged engaging with the ring-shaped conductor while the ring-shaped conductor is fixedly disposed on the stator; and thereby, by the magnetic field resulting from the passing of current through the conductive element the axial flux of the permanent magnet is increased and thus the torque of the motor is increased and the demagnetization of the permanent magnet is prevented.

In an exemplary embodiment, the permanent magnet can be made of a material of permanent magnetism, such as rubidium-iron-boron magnet, aluminum-nickel-cobalt magnet, samarium-cobalt magnet, or ferrite magnet.

In an exemplary embodiment, the conductive element can be a copper wire, an assembly of a plurality of copper wires, a copper plate, or an assembly of a plurality of copper plates.

In an exemplary embodiment, a direct current provided for passing through the conductive element is transmitted by the direct contact between the pair of electric brushes and the ring-shaped conductor.

In an exemplary embodiment, the surface of the conductive element is coated with a layer of insulation material.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
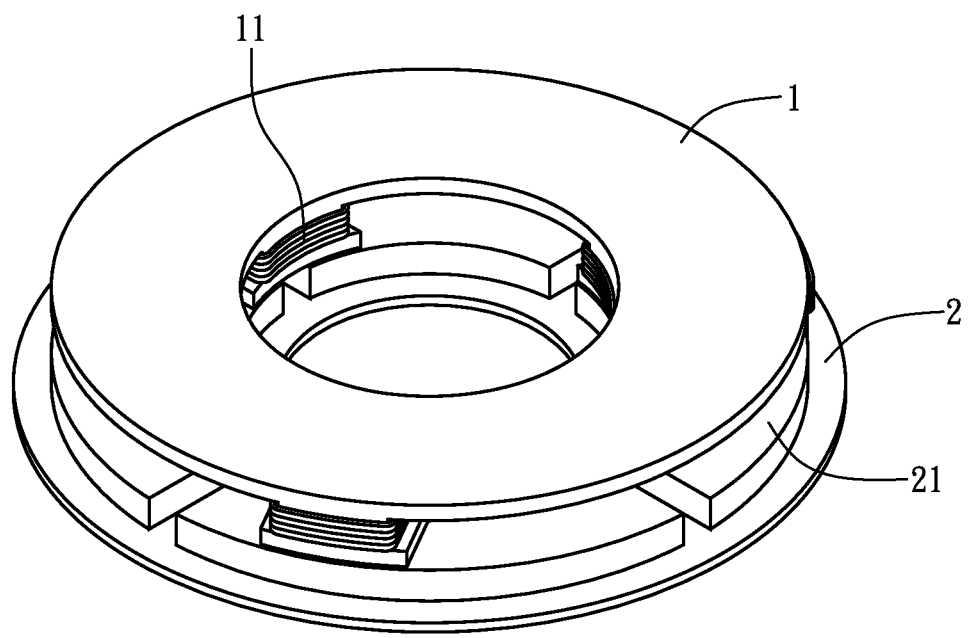
FIG. 1 is a three dimensional view of a conventional axial-flux permanent-magnet motor.
Figure 2:
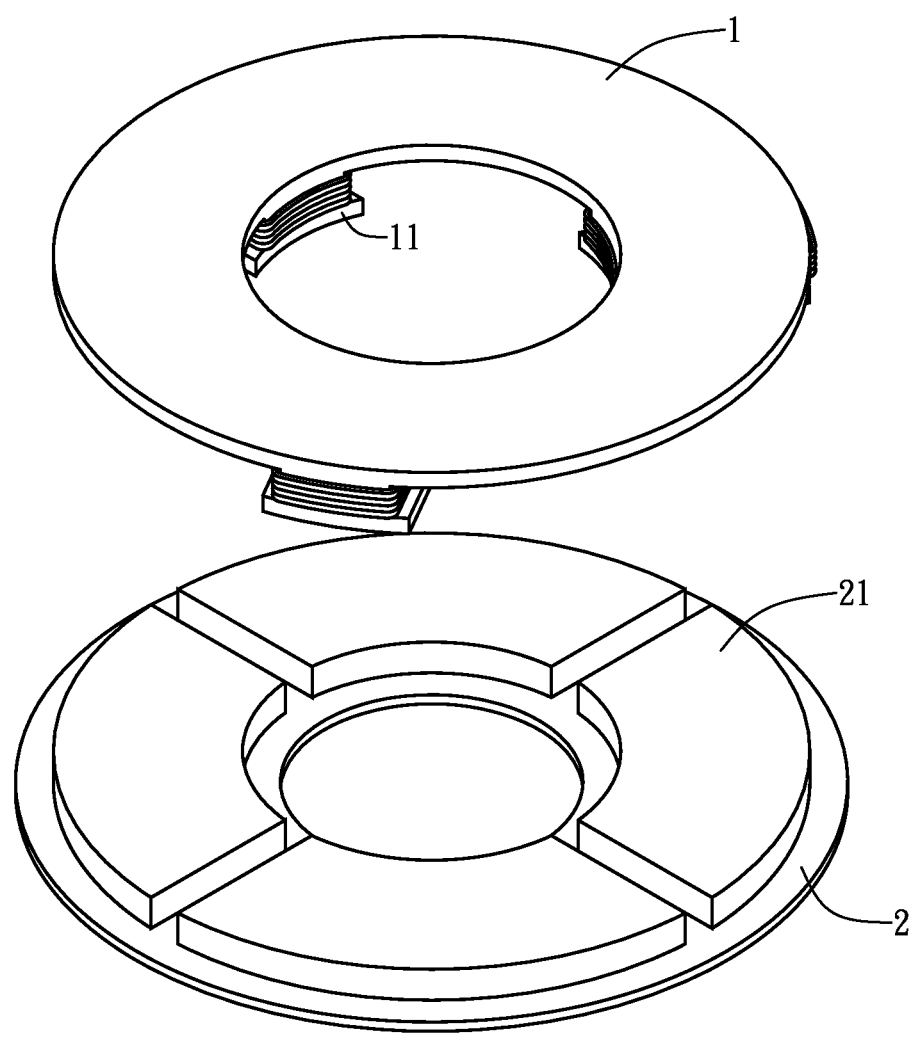
FIG. 2 is an exploded view of the conventional axial-flux permanent-magnet motor of FIG. 1.
Figure 3:
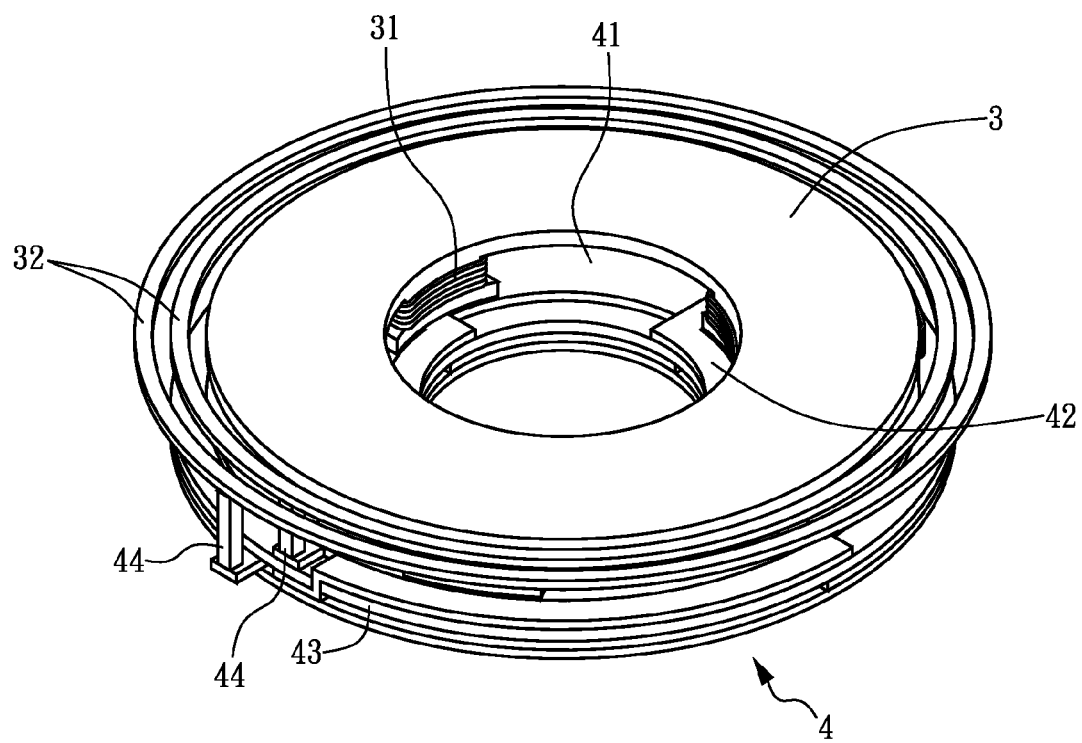
FIG. 3 is a three dimensional view of an adjustable axial-flux disc motor according to an embodiment of the invention.
Figure 4:
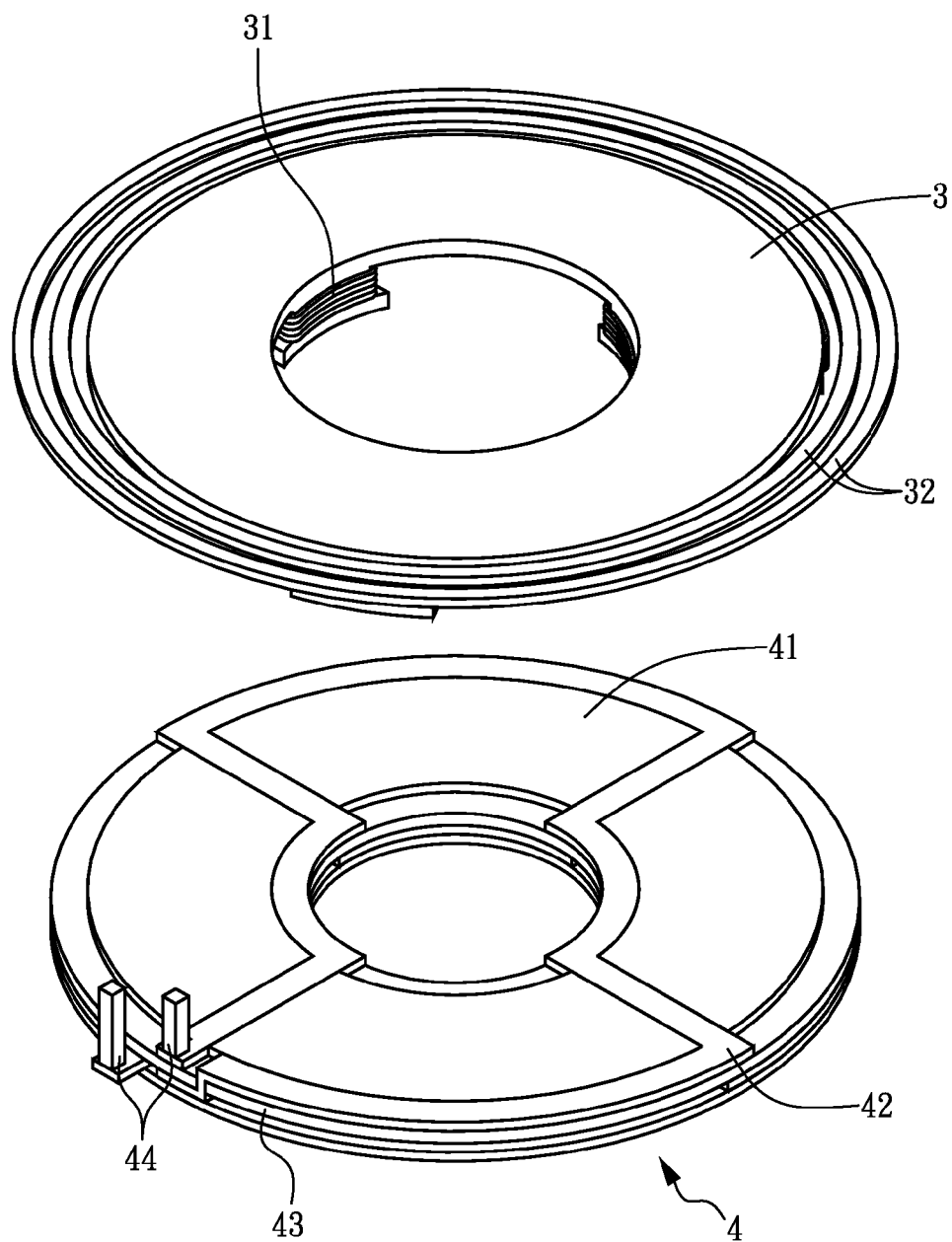
FIG. 4 is an exploded view of the adjustable axial-flux disc motor of FIG. 3.
Figure 5:
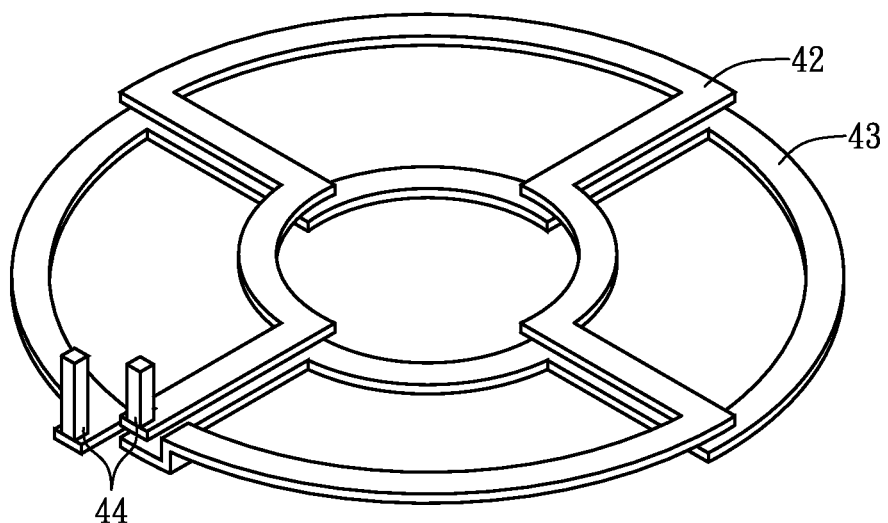
FIG. 5 is a three dimensional view of a conductive element used in the present disclosure.
Figure 6:
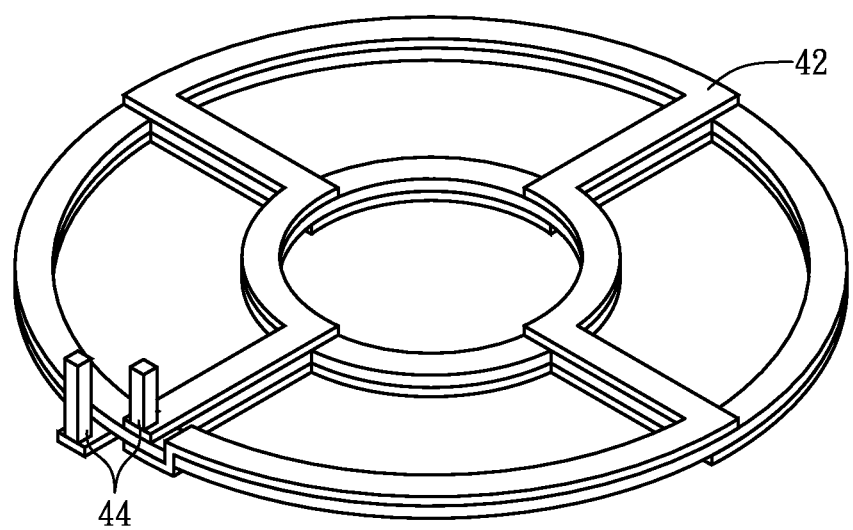
FIG. 6 is a three dimensional diagram showing an assembly of a conductive element and a soft magnetic material according to the present disclosure.
Figure 7:
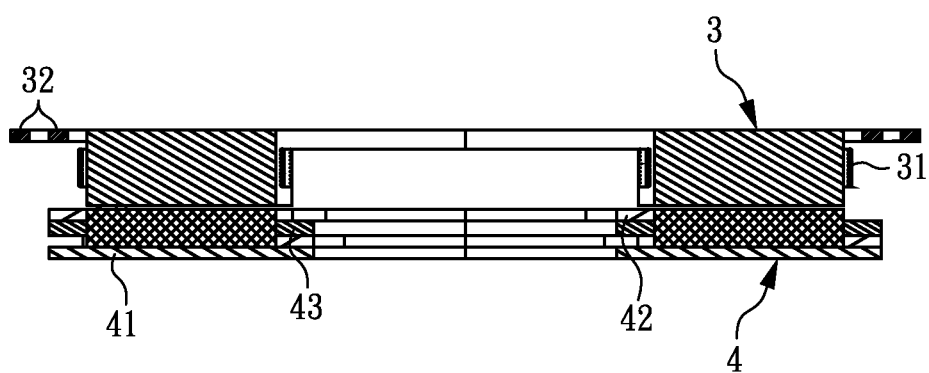
FIG. 7 is a cross sectional view of an adjustable axial-flux disc motor according to an embodiment of the invention.
Figure 8:
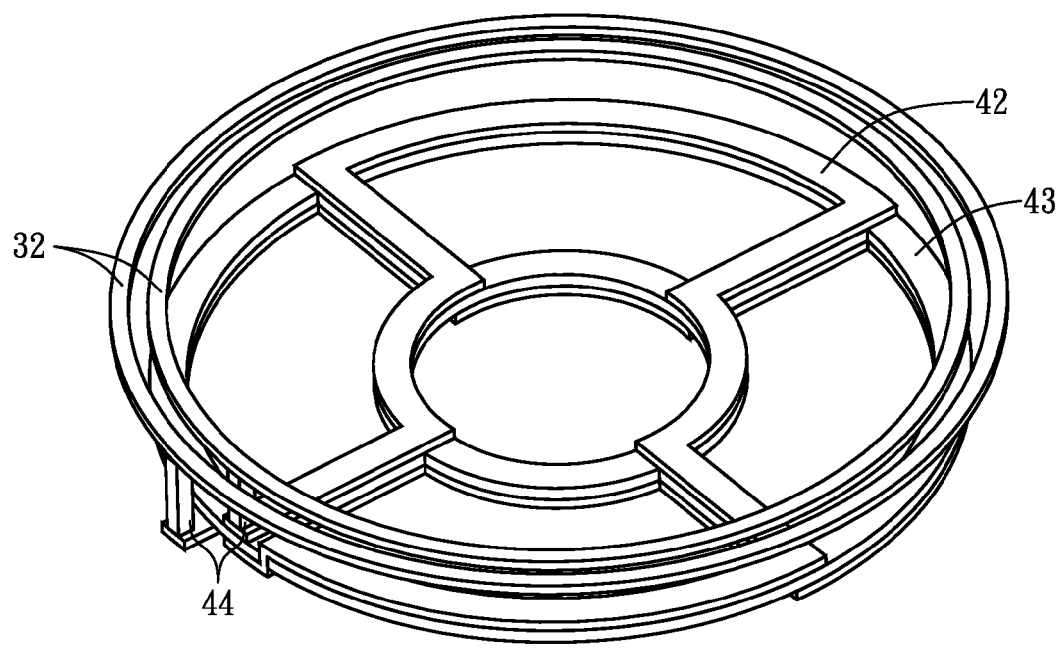
FIG. 8 is a schematic diagram showing a variable-flux DC conductive structure according to the present disclosure.

As shown in FIG. 3 to FIG. 8, the axial-flux motor of the present disclosure, being an axial-flux disc motor, is composed of two major structures, which are a stator 3 and a rotator 4. The stator 3 includes a coil 31 and a ring-shaped conductor 32, while the rotator 4 includes a permanent magnet 41, a conductive element 42, at least one soft magnetic material 43 and a pair of electric brushes 44, in which the coil 31 is wrapped on the stator 3; the stator 3 is disposed spaced from the permanent magnet 41 by an air gap while the permanent magnet 41 is disposed on the rotator 4; the conductive element 42 is composed of a top layer and a bottom layer and is disposed next to the permanent magnet 41 for surrounding the same while enabling the at least one soft magnetic material 43 to be filled in a gap sandwiched between the two layer. Moreover, when a current from an external power source is fed to the conductive element 42, a magnetic field will be generated whose magnetic line of force will travel passing the soft magnetic material 43 and through the permanent magnet 41, the air gap to the stator 3, where it will interact with the magnetic field generated from the coil 31, and consequently causing the torque of the motor to increase. In addition, when the rotator 4 is being driven to rotate, the pair of electric brushes 44 of the rotator 4 will engage with the ring-shaped conductor 32 whereas the ring-shaped conductor 32 is fixedly disposed on the stator 3 that it is not going to rotate, and thereby, by that a direct current provided for passing through the conductive element 42 is transmitted by the direct contact between the pair of electric brushes 44 and the ring-shaped conductor 32, and thus causing the air gap magnetic flux to vary accordingly.

In an exemplary embodiment, the permanent magnet 41 is made of a material of permanent magnetism, that is selected from the group consisting of: rubidium-iron-boron magnet, aluminum-nickel-cobalt magnet, samarium-cobalt magnet, and ferrite magnet.

Moreover, the conductive element 42 can be a copper wire, an assembly of a plurality of copper wires, a copper plate, or an assembly of a plurality of copper plates; and the surface of the conductive element is further being formed with a layer of insulation material by electroplating or coating.

To sum up, the present disclosure relates to an adjustable axial-flux motor, in which a permanent magnet with comparatively weaker magnetism is selected to be the source of a magnetic field in the motor. Any permanent magnet motor has a linear relationship to motor torque and current. This ratio is called the motor torque constant and is directly proportional to the voltage constant which describes the voltage generated per RPM or per rad/sec. Moreover, as motors are generally being defined to operate under a normal working range and when a motor is operating well outside its normal working range for a long period of time under field-weakening control, problems such as overheating or low working efficiency can be resulted. In addition to the use of permanent magnets as its magnetic field source similar to those conventional rotating motors, the motor of the present disclosure further has its magnets to be coiled by copper wires, copper plates or other conductive materials, and further being configured with electric brushes or other conductive means for conducting direct current into the conductive materials surrounding the permanent magnets so as to induce an electromagnetic field. Thereby, the magnetic intensity of the permanent magnets are increased and thus the working range of the motor is enlarged, so that the motor can work well both in a high-speed/low-torque configuration or in a low-speed/high-torque configuration without demagnetizing the permanent magnet.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An adjustable axial-flux disc motor, comprising:
a stator, having a coil and a ring-shaped conductor; and
a rotator, having a permanent magnet, a conductive element, at least one soft magnetic material and a pair of electric brushes;
wherein, the coil is wrapped on the stator; the stator is disposed spaced from the permanent magnet by an air gap while the permanent magnet is disposed on the rotator; the conductive element is composed of a top layer and a bottom layer and is disposed next to the permanent magnet for surrounding the same while enabling the at least one soft magnetic material to be filled in a gap sandwiched between the two layer; the pair of electric brushes of the rotator is arranged engaging with the ring-shaped conductor while the ring-shaped conductor is fixedly disposed on the stator; and thereby, by the magnetic field resulting from the passing of current through the conductive element, the axial flux of the permanent magnet is increased and thus the torque of the motor is increased and the demagnetization of the permanent magnet is prevented.

2. The motor of claim 1, wherein the permanent magnet is made of a material of permanent magnetism, selected from the group consisting of: rubidium-iron-boron magnet, aluminum-nickel-cobalt magnet, samarium-cobalt magnet, and ferrite magnet.

3. The motor of claim 1, wherein the conductive element can be a copper wire, an assembly of a plurality of copper wires, a copper plate, or an assembly of a plurality of copper plates.

4. The motor of claim 1, wherein a direct current provided for passing through the conductive element is transmitted by the direct contact between the pair of electric brushes and the ring-shaped conductor.

5. The motor of claim 1, wherein the surface of the conductive element is formed with a layer of insulation material by electroplating or coating.

* * * * *